United States Patent [19]

Kohn

[11] 4,366,536
[45] Dec. 28, 1982

[54] MODULAR DIGITAL COMPUTER SYSTEM FOR STORING AND SELECTING DATA PROCESSING PROCEDURES AND DATA

[75] Inventor: Leslie D. Kohn, San Mateo, Calif.

[73] Assignee: National Semiconductor Corporation, Santa Clara, Calif.

[21] Appl. No.: 140,590

[22] Filed: Apr. 15, 1980

[51] Int. Cl.³ .......................... G06F 7/00; G06F 7/06; G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,614,746 | 10/1971 | Klinkhamer | 364/200 |
| 4,025,901 | 5/1977 | Bachman et al. | 364/200 |
| 4,084,224 | 4/1978 | Appell et al. | 364/200 |
| 4,128,875 | 12/1978 | Thurber et al. | 364/200 |
| 4,128,880 | 12/1978 | Cray, Jr. | 364/200 |
| 4,173,783 | 11/1979 | Couleur et al. | 364/200 |

Primary Examiner—Felix D. Gruber
Assistant Examiner—John Gladstone Mills
Attorney, Agent, or Firm—Brown & Martin

[57] ABSTRACT

A digital computer system for selecting and linking multiple separately stored data processing procedures consisting of assembly level commands and for selecting a variable data area from a plurality of variable data areas. The system includes memories for storing the data processing procedures, the variable data areas and linking addresses; a program counter for accessing the memory containing the stored data processing procedures; registers for accessing the memories containing the data and the linking addresses; and a hardware unit which is adapted to execute the assembly level commands contained in selected data processing procedures and to provide addresses to the respective memories and the program counter for accessing the memories and the program counter to select linking addresses, variable data areas and data processing procedures in accordance with assembly level commands in the data processing procedure being executed and previously selected addresses.

9 Claims, 7 Drawing Figures

MODULAR DIGITAL COMPUTER SYSTEM FOR STORING AND SELECTING DATA PROCESSING PROCEDURES AND DATA

BACKGROUND OF THE INVENTION

This invention relates to digital computers, and more particularly to the overall architecture of a digital computer. By overall architecture is herein meant the organization of the various registers and memories which a computer accesses in order to perform its instruction set.

In the prior art, the computer's instructions were typically stored in a digital memory, and the memory was sequentially accessed by a register called a program counter. Additional hardware such as an adder, etc., was provided to execute an instructions once it was fetched from the memory. But the memory and program counter were all the hardware that was provided for storing and accessing the instructions.

Such a computer architecture worked fine for relatively small programs, such as those which could be written by a single person, or by only a few persons working closely together. But some tasks simply are too large to be programmed that way. These more complex tasks require the programming efforts of many persons working independently of one another.

For example, a digital computer may have an assembly level command set which performs only fixed point binary architecture. Yet it may be desired to use this computer to also perform floating point arithmetic, or to calculate transcendental functions, or to perform other complex operations. In such a case, it generally takes several persons to program the floating point routines plus several additional persons to program the transcendental functions. Each routine or function requires a separate data processing procedure program.

A problem then arises as to how to link all of the independently written programs together. Accordingly, it is a primary object of the invention to provide a new computer architecture that is especially adapted to linking multiple data processing procedure programs that are independently written by a plurality of persons.

SUMMARY OF THE INVENTION

The present invention is a modular digital computer system including first, second, third and fourth memories for storing data, data procedure programs and linking addresses, and digital apparatus for accessing these memories to select and link procedures and associated data therefrom in response to assembly level commands contained in the selected procedures.

The first memory stores N absolute address trios, where N is an integer greater than one. Each of the absolute address trios is selectable by a respective module address. Each of the absolute address trios consists of a link page table address, a code base address and a static data base address.

The second memory stores N code segments. Each of the code segments is selectable by a respective one of the code base addresses and consists of a plurality of the procedures, with each procedure beginning at an offset address relative to the code base address of the corresponding code segment.

The third memory stores N static data segments. Each of the static data segments is selectable by a respective one of the static data base addresses and consists of a plurality of the variable data areas with each variable data area having an absolute address.

The fourth memory stores N link tables. Each of the link page tables is selectable by a respective one of the link page table addresses and contains a number of first and second relative address pairs, and/or a number of the absolute variable data area addresses. Each of the relative address pairs is selectable by a respective predetermined displacement address in an assembly level command, with the first relative address indicating one of the N code base addresses in the first digital memory and the second relative address indicating the offset therefrom to a predetermined one of the procedures. Each of the absolute variable data area addresses is selectable by a respective given displacement address in an assembly level command.

The term "assembly level command" as used herein means any type of command or instruction for accessing stored data processing procedures or stored data, notwithstanding the context in which such command or instruction occurs.

The digital apparatus for linking and selecting the stored procedures and the stored data areas, includes a module register, a program counter, a static data address register a link page table register and a hardware unit which is adapted to execute assembly level commands contained in the selected procedures.

The module register is adapted for selecting an absolute address trio from the first digital memory in response to a module address.

The link page table address register is adapted for selecting a relative address pair from the fourth digital memory in response to the link page table address in the selected absolute address trio and in response to the predetermined displacement address, and is also adapted for selecting an absolute variable data area address from the fourth digital memory in response to the link page table address in the selected absolute address trio and in response to the given displacement address.

The program counter is adapted for selecting a procedure from the second digital memory in response to the code base address and the offset address indicated by the selected relative address pair. In the preferred embodiment, each first relative address contained in the relative address pair is the module address of the absolute address trio containing the indicated code base address; and the module register is adapted for selecting the indicated code base address from the first digital memory in response to the first relative address in the selected relative address pair to thereby enable the program counter to select the addressed procedure.

The static data address register is adapted for selecting a variable data area from the third digital memory in response to the static data base address in the selected absolute address trio and a fixed displacement address that is included in an assembly level command, or in response to the selected absolute variable data area address. In the preferred embodiment, the second digital memory is adapted for storing a plurality of data fields in each of the variable data areas. Each of the data fields being selectable by a respective preassigned displacement address in an assembly level command; and the static data address register is adapted for selecting a data field in the selected variable data area in response to the preassigned displacement address.

In a further aspect of the present invention, that portion of the system that is useful for storing and selecting data processing procedures may be exploited separately without regard as to how the data is stored and selected. In such an embodiment, the first digital memory stores absolute address pairs instead of absolute address trios, with each absolute address pair consisting of a link page address and a code base address.

Likewise, in another aspect of the present invention, the portion of the system that is useful for storing and selecting variable data areas may be exploited separately without regard as to how the data processing procedures are stored and selected. In such an embodiment, the first digital memory stores absolute address pairs instead of absolute address trios, with each absolute address pair consisting of a link page address and a static data base address.

Additional features and certain advantages of the present invention are discussed in reference to the description of the preferred embodiment.

DESCRIPTION OF THE PREFERRED EMBODIMENT

Figure 1:
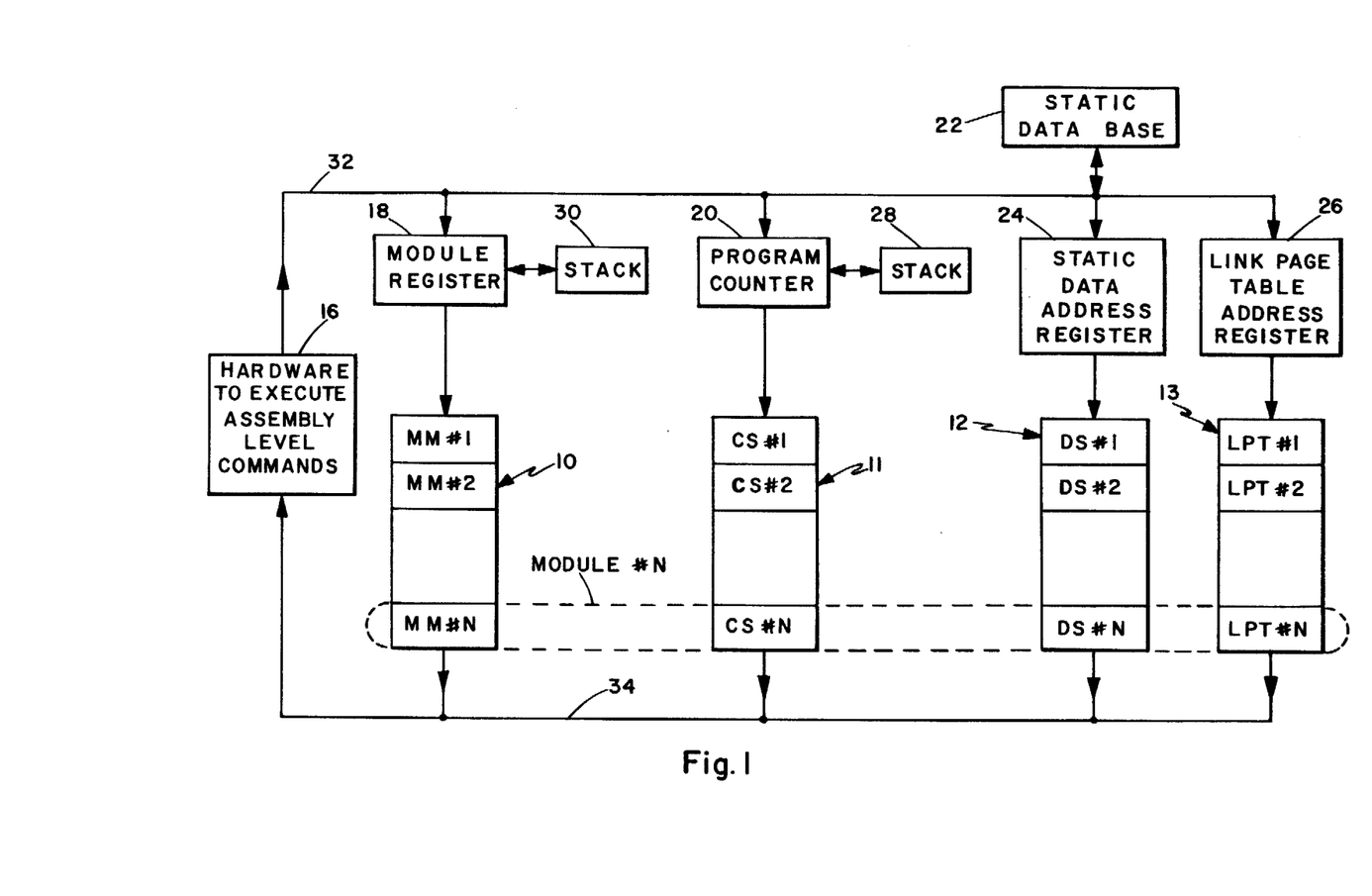
FIG. 1 is a schematic diagram illustrating the system of the present invention.

Referring to FIG. 1, a preferred embodiment of the system of the present invention includes four digital memories 10, 11, 12 and 13 and digital processing apparatus for accessing these memories. The digital processing apparatus includes a hardware unit 16, which is adapted to execute assembly level commands. The digital processing apparatus further includes a module register 18, a program counter 20, a static data base register 22, a static data address register 24, a link page table address register 26 and two stack registers 28 and 30.

Figure 5:
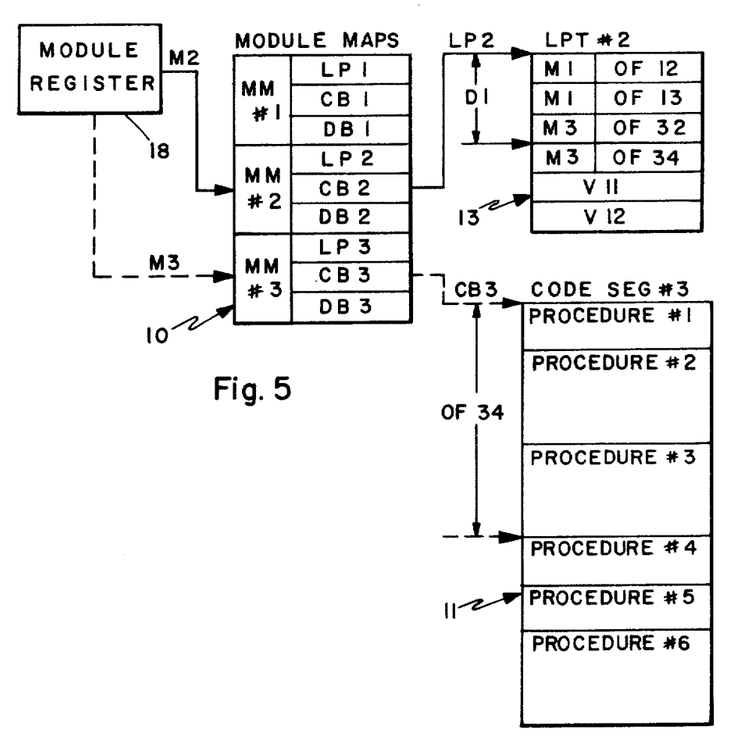
FIG. 5 is a schematic diagram illustrating the selection of a data processing procedure.
Figure 6:
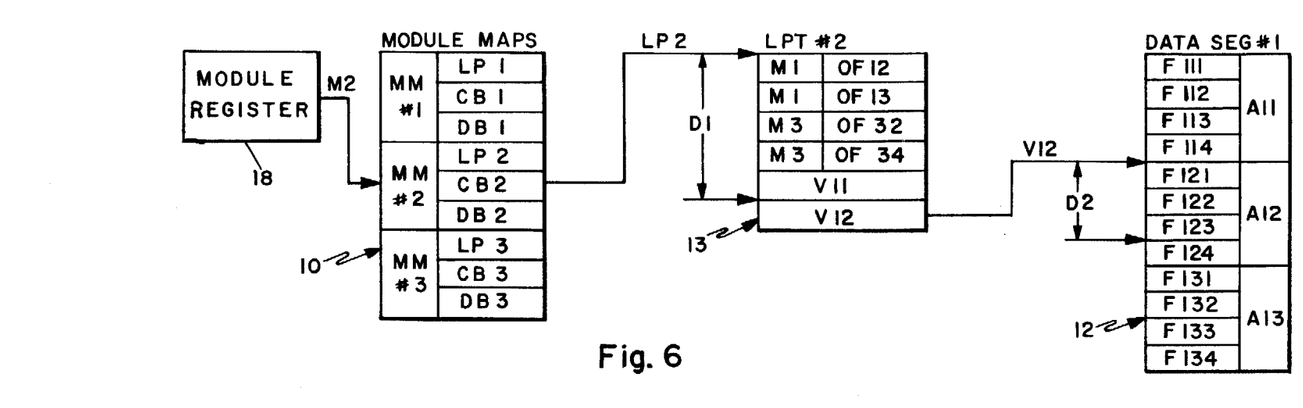
FIG. 6 is a schematic diagram illustrating the selection of a variable data area and a data field when the selected variable data area is not in the data segment indicated by the static data base address stored in the static data base register at the time a command for such selection is received.
Figure 7:
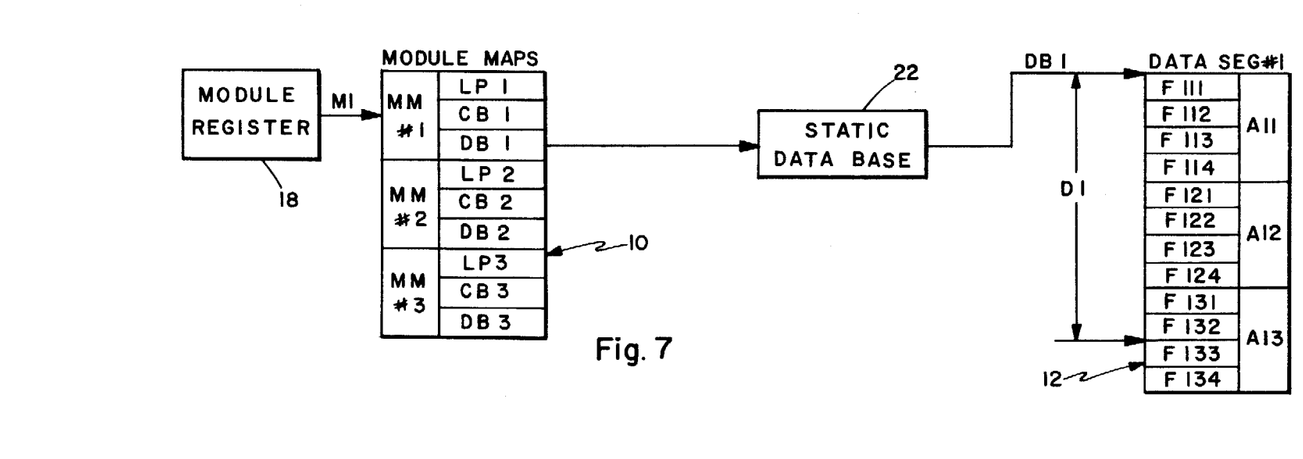
FIG. 7 is a schematic diagram illustrating the selection of a variable data area and a data field when the selected variable data area is within the data segment indicated by the static data base address stored in the static date base register at the time a command for such selection is received.

The first digital memory 10 stores a plurality of module maps, MM #1, MM #2 ... MM #N. N is any integer greater than one. Each module map consists of an absolute address trio. Each of the absolute address trios is selectable by a respective module address. Each of the absolute address trios consists of a link page table address, a code base address and a static base address, as shown in FIG. 5, 6 or 7, where the link page table address is designated by the symbol "LP," the code base address by "CB," and the static data base address by "DB." Module map MM #1 consists of the absolute address trio LP1, CB1, and DB1. Module map #2 consists of the absolute address trio LP2, CB2 and DB2; and module map #3 consists of the absolute address trio LP3, CB3, and DB3.

The digital memory 11 stores N code segments, CS #1, CS #2, ... CS #N. Each of the code segments is selectable by a respective one of the code base addresses and consists of a plurality of stored data processing procedures, as shown in FIG. 2.

Each procedure consists of a sequence of assembly level commands from a first command set. The procedure thus acts as individual commands of a high level language. For example, the assembly level commands of the first command set may suitably include a simple binary add, binary subtract, and binary compare; whereas the procedures always perform more complex operations, such as computing a sine, cosine, square root, or floating point multiply.

Figure 2:
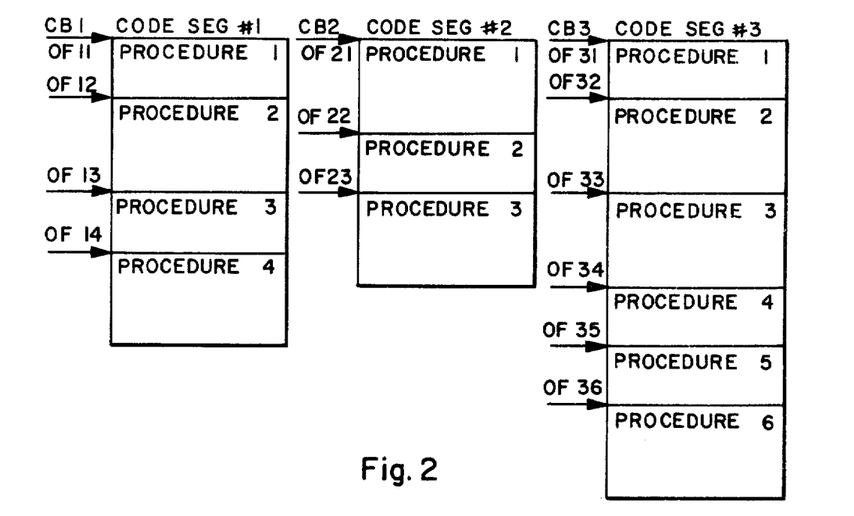
FIG. 2 is a schematic diagram illustrating the construction of the code segments in the system of FIG. 1.

Referring to FIG. 2, each of the code segments may contain any number of procedures. For example, code segment #1 includes four procedures for calculating several transcendental functions; code segment 190 2 includes three procedures for calculating several floating point operations; and code segement #3 includes six miscellaneous procedures. In general, the number of procedures in one code segment is not equal to the number of procedures in any other code segment.

Each procedure begins at an offset address relative to the code base address of the corresponding code segment. Referring to FIG. 2, the offset addresses for the procedures in code segment #1 are designated by the symbols OF11, OF12, OF13 and OF14; the offset addresses for the procedures in code segment #2 are OF21, OF22, and OF23; and the offset addresses for the procedures in code segment #3 are OF31, OF32, OF33, OF34, OF35, and OF36. The offset relative to the code base address of the corresponding code segment is to the beginning of the procedure. Thus there is no offset for the first procedure stored in each code segment and the offset addresses OF11, OF21 and OF31 respectively coincide with the corresponding code base address CB1, CB2, and CB3.

Figure 3:
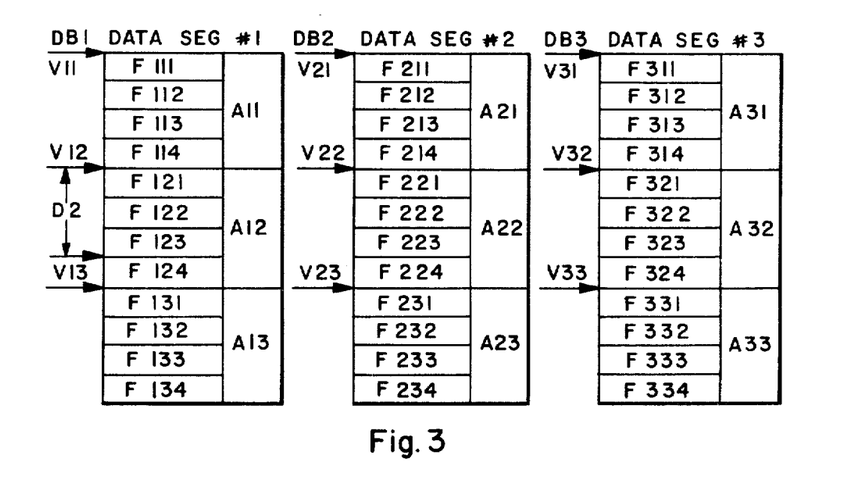
FIG. 3 is a schematic diagram illustrating the construction of the static data segments in the system of FIG. 1.

The digital memory 12 stores N static data segments, DS #1, DS #2, ... DS #N. Each of the static data segments is selectable by a respective one of the static data base addresses and consists of a plurality of variable data areas, as shown in FIG. 3. Data segment #1 consists of three variable data areas A11, A12 and A13; data segment #2 consists of variable data areas A21, A22, and A23; and data segment #3 consists of variable data areas A31, A32, and A33. It is not necessary, however, that each data segment consist of the same number of variable data areas in other embodiments of the system.

Each variable data area has an absolute address. The absolute addresses for the variable data areas in data segment #1 are designated by the symbols V11 for area A11, V12 for area A12 and V13 for area A13; the absolute addresses for the variable data areas in data segment #2 are V21 for area A21, V22 for area A22 and V23 for area A23; and the absolute address for the variable data areas in data segment #3 are V31 for area A31, V32 for area A32 and V33 for area A33. The absolute addresses for the first variable data area A11, A21 and A31 stored in their corresponding data segments DS #1, DS #2 and DS #3 respectively coincide with the corresponding static data base addresses DB1, DB2 and DB3.

Each of the variable data areas consists of a plurality of data fields, such as data fields F121, F122, F123 and F124 in variable data area A12 for example. Although each of the variable data areas in the embodiment of the system shown in FIG. 3 consists of four data fields, it is not necessary that each variable data area consist of the same number of data fields in other embodiments of the system.

Each of the data fields is selectable by a preassigned displacement address in an assembly level command relative to the absolute address of the corresponding variable data area. In the embodiment shown in FIG. 3, the data field F124 is selectable by the displacement address D2 in relation to the absolute address V12 for the variable data area A12.

The digital memory 13 stores N link page tables LPT #1, LPT #2, ... LPT #N. Each of the link page tables is selectable by a respective one of the link page table address. Each link page table contains a number of first and second relative address pairs, and/or a number of absolute addresses for the variable data areas.

Figure 4:
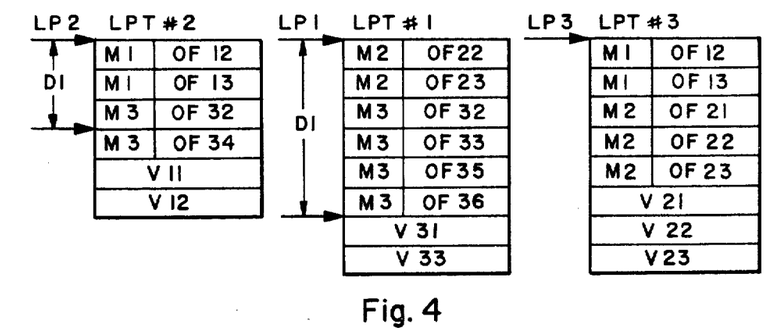
FIG. 4 is a schematic diagram illustrating the construction of the link page tables in the system of FIG. 1.

Referring to FIG. 4, link page table LPT #1 contains six relative address pairs "M2 and OF22," "M2 and OF23," "M3 and OF32," "M3 and OF33," "M3 and OF35" and "M3 and OF36," and two absolute addresses V31 and V33. Link page table LPT #2 contains four relative address pairs "M1 and OF12," "M1 and OF13," "M3 and OF=" and "M3 and OF34," and two absolute addresses V11 and V12. Link page table LPT #3 contains five relative address pairs "M1 and OF12," "M1 and OF13," "M2 and OF21," "M2 and OF22", and "M2 and OF23," and three absolute addresses V21, V22 and V23.

The first relative address (e.g. M1, M2, M3) indicates one of the N code base addresses in the digital memory 10. In the preferred embodiment of the system each first relative address M1, M2, M3 contained in a relative address pair if the module address of the absolute address trio (module map) MM #1, MM #2, MM #3, respectively containing the indicated code base address.

The second relative address in a relative address pair indicates the offset from the indicated code base address to a predetermined one of the procedures stored in the corresponding code segment, as discussed with reference to FIG. 2.

Each of the relative address pairs is selectable by a respective predetermined displacement address in an assembly level command relative to the link page address of the corresponding link page table. In the embodiment shown in FIG. 4, the relative address pair "M3 and OF34" in link page table LPT #2 is selectable by the displacement address D1 in relation to the link page table address LP2.

Each of the absolute variable data area addresses in the link page tables is selectable by a respective given displacement address in an assembly level command relative to the link page address of the corresponding link page table. In the embodiment shown in FIG. 4, the absolute address V31 in link page LPT #1 is selectable by the displacement address D1 in relation to the link page table address LP1.

The module register 18 is adapted for selecting an absolute address trio from the memory 10 in response to a module address. The module address is received from the hardware unit 16 via the bus 32. The selected absolute address trio is provided on the bus 34 to the hardware unit 16.

The link page table address register 26 is adapted for selecting a relative address pair or an absolute address from the memory 13 in response to the link page table address in the selected absolute address trio and in response to a respective displacement address in an assembly level command. The link page table address and the displacement address are received from the hardware unit 16 via the bus 32. The selected relative address pair is provided on the bus 34 to the hardware unit 16.

The program counter 20 is adapted for selecting a procedure from the memory 12 in response to the code base address and the offset address indicated by the selected relative address pair. The code base address and the offset address are received from the hardware unit 16 via the bus 32. The selected procedure is provided on the bus 34 to the hardware unit 16. The module register 18 is adapted for selecting the indicated code base address from the memory 10 in response to the module address in the selected relative address pair to thereby enable the program counter 20 to select the indicated procedure. The module address is received by the module register 20 from the hardware unit 16 via the bus 32.

The stack register 28 stores the address of the assembly level command in the currently executed procedure that follows the assembly level command that invoked the selected procedure and provides the stored address to the program counter 20 in a last-stored-first provided sequence.

The stack register 30 stores the module address of the selected absolute address trio containing the code base address of the selected procedure while the selected procedure is being executed, and provides the stored module address to the module register 18 in a last-stored-first-provided sequence.

The static data address register 24 is adapted for selecting a variable data area from the memory 12 either in response to the static data base address in the selected absolute address trio and a fixed displacement address in an assembly level command, or in response to the selected absolute variable data area address. The static data base address and the fixed displacement address are received from the hardware unit 16 via the bus 32. The absolute variable data area address also is received from the hardware unit 16 via the bus 32. The selected data area is provided on the bus 34 to the hardware unit 16. The static data address register 24 also is adapted for selecting a data field in the selected variable data area in response to a preassigned displacement address in an assembly level command either relative to the absolute address of the selected variable data area or relative to the static data base address. The preassigned displacement address is the same as the fixed address in the latter case. The preassigned displacement address is received from the hardware unit 16 via the bus 32.

The static data base register 22 is adapted for storing the static data base address of the absolute address trio selected by the module register 18, and for providing the stored static data base address to the static data address register 24 for enabling selection of a variable data area when the data area selection is in response to a respective static data base address.

The static data address register 24 also is adapted for selecting a variable data area from the memory 12 in response to the static data base address in the static data base register 22 and in response to a sequentially first displacement address in an assembly level command when the selected variable data area is in the data segment indicated by the static data base address in the static data base register 22 at the time the assembly level command is received. The displacement address is received from the hardware unit 16 via the bus 32.

The operation of the system in three different modes will now be described.

The system is operated in a "call external procedure" mode when it is necessary to select a procedure from a code segment other than the code segment containing the procedure that is currently being executed. The procedure to be selected in this mode is designated the called external procedure.

The "external data address" mode is used to select data when it is necessary to access data that is not the data segment having its static data base address in the absolute address trio corresponding to the current module address.

The "static base relative address" mode is used to select data when the variable data area or data field to be selected is in the data segment that has a static data base address in the absolute address trio of the module map that is currently selected by the module register 18.

An example of operation in the call external procedure mode is described with reference to FIGS. 1 and 5.

In this example, the currently executed procedure is in code segment #2, and the called external procedure is procedure #4 in code segment #3. The called procedure is called for by an assembly level command on the bus 34 from the memory 11 to the hardware unit 16, containing the predetermined displacement address D1.

For the currently executed (previously selected) procedure, the module address M2 was provided to the module register 18 and caused the module register 18 to select the absolute address trio in module map MM #2 stored in the memory 10. The selected addresses LP2, CB2 and DB2 were provided on the bus 34 to the hardware unit 16, whereupon the link page address LP2 was provided to the link page table register 26 via the bus 32. The displacement address D1 also is provided to the link page table register 26 via the bus 32.

The link page address LP2 caused the link page table register 26 to select the link page table LPT #2 stored in the memory 13; and the displacement address D1 is added to the link page address LP2 to cause the link page table register 26 to select the relative address pair "M3 and OF34" in the link page table LPT #2. The selected relative address pair M3 and OF34 are provided on the bus 34 to the hardware unit 16; whereupon the module address M3 is provided to the module register 18 via the bus 32 and the offset address OF34 is provided to the program counter 20 via the bus 32.

The address of the next instruction in the previously selected (currently executed) procedure that follows the called procedure is stored in the stack register 28 from the program counter 20 and the module address M2 of the selected absolute address trio containing the code base address CB2 of the previously selected procedure is stored in the stack register 30 from the module register 18 while the selected (called) procedure is being executed.

The module register M3 causes the module register 18 to select the absolute address trio in the module map MM #3 stored in the memory 10. The selected addresses LP3, CB3 and DB3 are then provided on the bus 34 to the hardware unit 16, whereupon the code base address CB3 is provided to the program counter 20 via the bus 32 together with the offset address OF34.

The code base address CB3 causes the program counter 20 to select the code segment CS #3 stored in the memory 11; and the offset address OF34 is added to the code base address CB3 to cause the program counter 20 to select procedure #4 from the code segment #3. The selected procedure is provided to the hardware unit 16 via the bus 34.

When execution of the selected called external procedure is completed, the address of the next instruction in the last previously addressed but uncompleted procedure stored in the stack register 28 is restored to the program counter 20, and execution of the uncompleted procedure continues until it is completed or until another command is received that causes the address of still another called external procedure to be loaded in the program counter 20. When the address of the next instruction in the previously selected procedure is restored from the stack register 28 to the program counter 20, the address of the module map containing the code base address of the code segment containing the previously selected procedure is restored from the stack register 30 to the module register 18.

An example of operation in the external data address mode is described with reference to FIGS. 1 and 6. In this example, it is desired to select data field F124 in data segment #1. It is assumed that the module address stored in the module register 18 is other than M1 and that the static data base address stored in the static data base register 22 is other than DB1. Accordingly, it is necessary to operate in the external data address mode. The desired data field F124 is called for by an assembly level command on the bus 34 from the memory 11 to the hardware unit 16, containing respective given and preassigned displacement addresses, designated D1 and D2 in accordance with their sequence.

In this example, the current module address M2 was provided to the module register 18 and caused the module register 18 to select the absolute address trio in module map #2 stored in the memory 10. The selected addresses LP2, CB2 and DB2 were provided on the bus 34 to the hardware unit 16; whereupon the link page address LP2 was provided to the link page table register 26 via the bus 32. The given displacement address D1 is also provided to the link page table register 26 via the bus 32.

The link page address LP2 caused the link page table register 26 to select the link page table LPT #2 stored in the memory 13; and the given displacement address D1 is added to the link page address LP2 to cause the link page table register 26 t select the absolute variable data area address V12 in the link page table LP #2. The selected absolute address V12 is provided on the bus 34 to the hardware unit 16; whereupon the absolute address V12 is provided to the static data address register 24 via the bus 32 together with the preassigned displacement address D2.

The absolute address V12 causes the static data address register 24 to select the variable data area A12 in data segment #1 stored in the memory 12; and the displacement address D2 is added to the absolute address V12 to cause the static data address register 24 to select the data field F124 from data segment #1. The selected data field F124 is provided to the hardware unit 16 via the bus 34.

An example of operation in the static base relative address mode is described with reference to FIGS. 1 and 7. In this example, it is desired to select data field F133 in data segment #1. In this example, module address M1 is already stored in the module register 18 and static data base address DB1 is stored in the static data base register 22. The desired data field F133 is called for by an assembly level command containing a fixed, preassigned displacement address D1, which is provided to the static data address register 24 via the bus 32 from the hardware unit 16.

The displacement address D1 is added by the static data address register 24 to the static data base address DB1 stored in the static data base register 22 to thereby select the data field F133 from data segment #1. The selected data field F133 is provided to the hardware unit 16 via the bus 34.

One primary feature of the above described computer system is that it enables the various procedures to be treated as separate blocks of code that are relatively independent of one another. For example, to change the starting address of all the procedures in one code segment, only one entry in the module map need be changed. This is particularly useful where the procedures are to be temporarily stored on disc or tape and are transferred into a faster read/write memory as they are used.

References to procedures in other code segments do not have to be resolved until the link page table is created. Thus, a code segment can be completed much earlier than its corresponding link page table. One code segment can be used in different data processing systems by linking through different link page tables. This is particularly useful when the code segment is to be stored in a read only memory and used in different data processing systems.

Similar advantages pertain from the system of the present invention for storing various data fields in different data segments and for linking different data segments for use in different data processing routines.

A preferred embodiment of the system of the present invention has been described in detail. In addition, many changes and modifications can be made to those details without departing from the nature and spirit of the invention. For example, the link page table addresses in the module map could point to any entry of the link page table, not just the first entry of the table. Similarly, the code base addresses in the module map could point to any entry in the corresponding code segments, and the offset could be defined relative to that point. Therefore, in view of these and other possible modifications, it is to be understood that the invention is not limited to said details, but is defined by the appended claims.

I claim:

1. A digital computer system for selecting and linking multiple separately stored data processing procedures consisting of assembly level commands and for selecting a variable data area from a plurality of variable data areas, comprising:

a first memory for storing N absolute address trios, where N is any integer greater than one, each of said absolute address trios being selectable by a respective module address with each of said absolute address trios consisting of a link page table address, a code base address and a static data base address;

a second memory for storing N code segments, each of said code segments being selectable by a respective one of said code base addresses and consisting of a plurality of said procedures, with each procedure beginning at an offset address relative to the code base address of the corresponding code segment;

a third memory for storing N static data segments, each of said static data segments being selectable by a respective one of said static data base addresses and consisting of a plurality of said variable data areas with each variable data area having an absolute address;

a fourth memory for storing N link page tables, each of said link page tables being selectable by a respective one of said link page table addresses and containing a number of first and second relative address pairs, each of the relative address pairs being selectable by a respective predetermined displacement address is an assembly level command, with the first relative address being a said module address thereby indicating one of said N code base addresses in the first memory and the second relative address indicating said offset address from the indicated code base address to a predetermined one of said procedures and/or containing a number of said absolute variable data area addresses, each of said absolute variable data area addresses being selectable by a respective given displacement address in an assembly level command;

a module register for accessing the first memory to select an absolute address trio from the first memory in response to said module address;

a link page table register for accessing the fourth memory to select a relative address pair from the fourth memory in response to the link page table address in the selected absolute address trio and in response to a said predetermined displacement address, and to select an absolute variable data area address from the fourth memory in response to the link page table address in the selected absolute address trio and in response to a said given displacement address;

a program counter for accessing the second memory to select a procedure from the second memory in response to the code base address and the offset address indicated by the selected relative address pair;

a data address register for accessing the third memory to select a variable data area from the third memory either in response to the static data base address in the selected absolute address trio and a fixed displacement address that is included in an assembly level command, or in response to the selected absolute variable data area address; and a hardware unit adapted to execute assembly level commands and coupled to the memories, the registers and the program counter for executing the procedures selected by the program counter from the second memory; for providing the module address in the relative address pair selected by the link page table register from the fourth memory to the module register for accessing the first memory to select a said absolute address trio; for providing the code base address selected by the module register from the first memory and the offset address selected by the link page table register from the fourth memory to the program counter for accessing the second memory to select a said data processing procedure; for providing the static data base address selected by the module register from the first memory and the displacement address included in an assembly level command of the executed procedure to the data address register for accessing the third memory to select a said variable data area; for providing the absolute variable data address selected by the link page table register from the fourth memory to the data address register for accessing the third memory to select a said variable data area; for providing the link page table address selected by the module register from the first memory and the predetermined displacement address included in an assembly level command of the executed procedure to the link page table register for accessing the fourth memory to select a said relative address pair; and for providing the link page table address selected by the module register from the first memory and the given displacement address included an assembly level command of the executed procedure to the link page table register for accessing the fourth memory to select a said absolute variable data area address.

2. A system according to claim 1, further comprising: a stack for storing the address of the assembly level commands in a currently executed procedure that follows the assembly level command that invoked the selected procedure, and for providing said stored address to the program counter in a last-stored-first-provided sequence.

3. A system according to claim 2, further comprising: a second stack for storing the module address of the selected absolute address trio containing the code base address of the previously selected procedure while said selected procedure is being executed, and for providing said stored module address to the module register in a last-stored-first provided sequence.

4. A system according to claim 1, further comprising: a data base register for storing the static data base address or the absolute address trio selected by the module register, and for providing said stored static data base address to the data address register for enabling selection of a said variable data area when said data area selection is in response to a respective said static data base address; and wherein the hardware unit is adapted for providing the static data base address selected by the module register from the first memory to the data base register for storage.

5. A system according to claim 1, for further selecting a data field contained in a said selected variable data area that consists of a plurality of data fields, wherein the third memory is adapted for storing a plurality of said data fields in each said variable data area, each of said data fields being selectable by a respective preassigned displacement address in an assembly level command; and wherein the data address register is adapted for selecting a data field in the selected variable data area in response to a said preassigned displacement address, and wherein the hardware unit is adapted for providing the preassigned displacement address includes in an assembly level command of the executed procedure to the data address register for accessing the third memory to select a said data field.

6. A system according to claim 5, wherein the data address register is adapted for selecting a said data field either by combining said preassigned displacement address with the selected absolute variable data area address, or by receiving said preassigned displacement address as the fixed displacement address and combining said fixed displacement address with the static data base address in the selected absolute address trio.

7. A digital computer system for selecting and linking multiple separately stored data processing procedures consisting of assembly level commands, comprising:
a first memory for storing N absolute address pairs, where N is any integer greater than one, each of said absolute address pairs being selectable by a respective module address with each of said absolute address pairs consisting of a link page table address and a code base address;
a second memory for storing N code segments, each of said code segments being selectable by a respective one of said code base addresses and consisting of a plurality of said procedures, with each procedure beginning at an offset address relative to the code base address of the corresponding code segment;
a third memory for storing N link page tables, each of said link page tables being selectable by a respective one of said link page table addresses and containing a number of first and second relative address pairs, each of the relative address pairs being selectable by a respective predetermined displacement address in an assembly level command, with the first relative address being a said module address thereby indicating one of said N code base address in the first memory and the second relative address indicating said offset address from the indicated code base address to a predetermined one of said procedures;
a module register for accessing the first memory to select an absolute address pair from the first memory in response to said module address;
a link page table register for accessing the third memory to select a relative address pair from the third memory in response to the link page table address in the selected absolute address pair and in response to a said predetermined displacement address;
a program counter for accessing the second memory to select a procedure from the second memory in response to the code base address and offset address indicated by the selected relative address pair; and
a hardware unit adapted to execute assembly level commands and coupled to the memories, the registers and the program counter for executing the procedures selected by the program counter from the second memory; for providing the module address in the relative address pair selected by the link page table register from the third memory to the module register for accessing the first memory to select a said absolute address pair; for providing the code base address selected by the module register from the first memory and the offset address selected by the link page table register from the fourth memory to the program counter for accessing the second memory to select a said data processing procedure; and for providing the link page table address selected by the module register from the first memory and the predetermined displacement address included in an assembly level command of the executed procedure to the link page table register for accessing the third memory to select a said relative address pair.

8. A system according to claim 7, further comprising:

a stack for storing the address of the assembly level command in a currently executed procedure that follows the assembly level command that invoked the selected procedure, and for providing said stored address to the program counter in a last-stored-first-provided sequence.

9. A system according to claim 8, further comprising:
a second stack for storing the module address of the selected absolute address pair containing the code base address of the previously selected procedure while said selected procedure is being executed, and for providing said stored module address to the module register in a last-stored-first-provided sequence.

* * * * *